United States Patent [19]

Pezaris

[11] Patent Number: 4,639,874

[45] Date of Patent: Jan. 27, 1987

[54] SYSTEM FOR MONITORING AND CONTROLLING POSITION OF HOISTS

[75] Inventor: Stylianos Pezaris, Winchester, Mass.

[73] Assignee: Thermo Electron Corporation, Waltham, Mass.

[21] Appl. No.: 601,766

[22] Filed: Apr. 18, 1984

[51] Int. Cl.⁴ ............................................. G05B 5/01
[52] U.S. Cl. .................................... 364/478; 414/279; 318/640; 250/561
[58] Field of Search ................ 364/478, 167; 250/223, 250/224, 234, 553, 555, 557, 561, 578; 318/640; 414/273, 279; 356/400, 401

[56] References Cited

U.S. PATENT DOCUMENTS

| | | | |
|---|---|---|---|
| 3,586,950 | 6/1971 | Prodel | 318/640 |
| 3,777,165 | 12/1973 | Bryant et al. | 250/555 |
| 3,786,929 | 1/1974 | Hathcock, Jr. | 414/273 |
| 3,815,084 | 6/1974 | Pease | 340/988 |
| 3,873,210 | 3/1975 | Konopka | 356/401 |
| 3,880,299 | 4/1975 | Zollinger | 414/273 |
| 3,899,687 | 8/1975 | Jones | 250/223 R |
| 3,902,308 | 9/1975 | Bernstein et al. | 356/400 |
| 3,972,622 | 8/1976 | Mason et al. | 356/400 |
| 4,007,843 | 2/1977 | Lubbers et al. | 414/273 |
| 4,110,611 | 8/1978 | Tann et al. | 350/231 R |
| 4,217,530 | 8/1980 | Dahm | 318/640 |
| 4,268,206 | 5/1981 | Johnson | 414/222 |
| 4,268,747 | 5/1981 | Becchi et al. | 250/231 SE |
| 4,415,975 | 11/1983 | Burt | 414/273 |
| 4,453,085 | 6/1984 | Pryor | 250/561 |
| 4,466,073 | 8/1984 | Boyan et al. | 356/400 |
| 4,488,237 | 12/1984 | Aronson et al. | 364/167 |
| 4,518,862 | 5/1985 | Dorn | 250/561 |

OTHER PUBLICATIONS

Brochure entitled "NAPCO Inc. . . . Engineered Plating Systems for Productivity & Reliability", pp. 1–11.

*Primary Examiner*—Jerry Smith
*Assistant Examiner*—Allen MacDonald
*Attorney, Agent, or Firm*—Herbert E. Messenger

[57] ABSTRACT

Disclosed is a system for monitoring and controlling movement of a hoist along a line of treatment tanks of an electroplating apparatus. Hoist-mounted optical sensing units of the system have pickups formed of opposed lines of infrared emitting diodes and phototransistors which interact with elements of plates fixed at work stations along the tanks to provide station identification and centering information relative to the hoist. A microprocessor-based controller on the hoist processes data from the sensing units and from a rotary encoder attached to a hoist drive motor and, under direction of an off-hoist main computer, rapidly and accurately positions the hoist at selected stations in a desired operating sequence.

6 Claims, 19 Drawing Figures

SYSTEM FOR MONITORING AND CONTROLLING POSITION OF HOISTS

BACKGROUND OF THE INVENTION

This invention relates to apparatus for controlling the position of conveyors and particularly to improved systems for monitoring and controlling the position of hoists which move articles to be treated along electroplating tanks.

Various mechanisms such as limit switches, bar code readers, and other optical devices have been used for determining the position of conveyors or elevator-conveyors such as hoists along a path to and from work stations. In the electroplating industry, for example, such mechanisms are utilized in controlling the movement of a hoist mounted over or on one side of a line of several tanks so that articles carried by the hoist may be immersed in baths of various tanks according to a desired sequence.

Each of the positioning systems currently in use have disadvantages. For example, mechanical devices such as limit switches which engage code plates in parallel are bulky and not very reliable. Bar code readers and similar optical coding devices depend on the reflectivity of code-generating materials and thus may be subject to errors from accumulation of dust, oil, or mist on the reflective materials or from spurious reflections. Bar code readers also cannot, unless complicated optics are used, identify the position of a hoist when the hoist is stationary. Transmissive optical systems which utilize one or more photoelectric switches traveling with the hoist and a stationary light at each work station are bulky and expensive; they typically require a separate electrical line for each light. Moreover, such systems do not provide positive station identification when the moving hoist is stopped by an on-station light, and positioning errors are possible if an incorrect light is illuminated.

Accordingly, it is an object of the invention to provide an improved system for monitoring the position of a conveyor such as a hoist.

It is a particular object of the invention to provide a system for monitoring and controlling the position of a hoist along a line of electroplating tanks which gives positive identification of station position.

It is an object of the invention to provide a compact, reliable, low cost system for accurately positioning a conveyor such as a hoist along a plurality of work stations.

SUMMARY OF THE INVENTION

The invention concerns improved apparatus for monitoring and controlling the position of a conveyor such as a hoist which moves articles to be treated along a line of tanks. Included in the control system is a sensing unit having an array of opposed radiation emitters and detectors mounted on the hoist and spaced along the direction of hoist movement. Stationary radiation blocking means are provided at each of several work stations along the path of the hoist to pass within the gap between the emitters and detectors as the hoist approaches a work station and to selectively block radiation from at least some of the emitters. A controller processes signals from the sensing unit to provide accurate information on the "on-station" positioning of the hoist and the identity of the station. The controller and one or more sensing units form part of a position control system which also includes a rotary encoder and motor drive attached to a hoist motor and which, under supervision of an off-hoist computer controller, rapidly and accurately positions the hoist at selected work stations according to a desired sequence of operation.

In a preferred embodiment two hoist-mounted sensing units are included in a monitoring and control system for an overhead hoist of an electroplating line. Each sensing unit has several transmission-type optical pickups comprising an infrared emitting diode and a phototransistor facing the diode and operable to detect its infrared emission. One sensing unit carries eight pickups arranged in a generally horizontal line and which interact with up to eight elements of stationary code plates attached to each work station as the plates pass through the gap between the diodes and phototransistors. Two end elements of the code plates function to block infrared radiation of the end diodes of the unit to indicate that the hoist is positioned "on-station", and the pattern of radiation blocked by up to six remaining code plate elements provides positive identification of the station. The second sensing element includes sixteen closely spaced optical pickups which interact with a centering plate attached to each work station to provide accurate positioning information. Also mounted on the hoist is a microprocessor/controller which is electronically connected to the sensing units, a rotary encoder which provides the microprocessor/controller with data on hoist position both at and between stations, and a variable frequency motor drive which, on instructions from the microprocessor/controller, operates a motor to move a hoist to selected work stations.

DESCRIPTION OF PREFERRED EMBODIMENTS

In the disclosure set forth below, those aspects of the invention relating to the monitoring and identification of the position of a hoist along a line of tanks will first be described in detail. This will be followed by a discussion of a preferred position control system incorporating the position identification subsystem.

Figure 1:
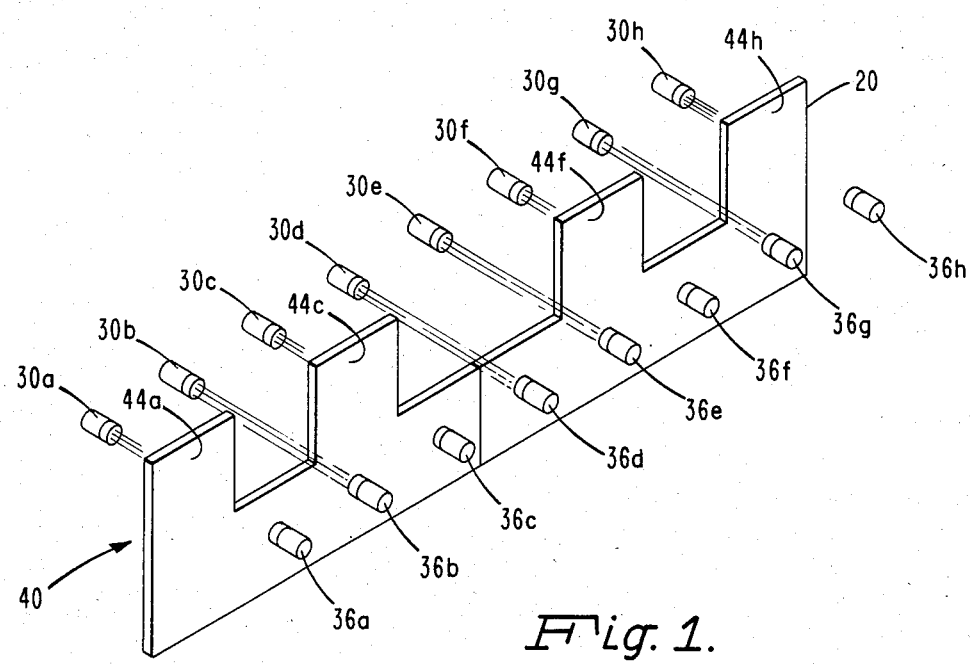
FIG. 1 is a partial view in perspective of a sensing unit and station code plate according to an embodiment of the invention.

FIG. 1 illustrates in schematic form a preferred radiation sensing unit and a station code plate 20 which form basic elements of the monitoring and control system of the invention. The sensing unit includes an array of several pickups (eight being shown by way of example) each including a radiation emitter 30 mounted opposite a radiation detector 36 and defining an elongated gap 40. As will be shown and described in greater detail hereinafter, the sensing unit is mounted on a conveyor or hoist which may be moved to and stopped at any of several stations such as work stations of tanks of an electroplating line. A stationary code plate such as the plate 20 is attached to each work station and oriented to pass within the gap 40 of the sensing unit as the hoist approaches the station. The plate 20 is formed with elements 44 which block or interrupt radiation from selected emitters such as the emitters 30a, 30c, 30f, and 30h when the hoist arrives "on-station". Preferably opposite ends of each plate such as the plate 20 include elements (44a, 44h) to block radiation from the corresponding end emitters 30a and 30h. The interruption of radiation detection by both detectors 36a and 36h provides a true indication that the movable hoist or conveyor is positioned at a work station. At the same time, positive identification of the specific station is indicated by the pattern of radiation sensed by the remaining detectors 36b –36g (for the station shown in FIG. 1 detectors 36b, 36d, 36e, and 36g sense radiation). Since from zero to six elements may be included in the plate, up to sixty-four different stations may be coded using the "eight position" plate of FIG. 1.

Infrared emitting diodes are currently preferred for use as radiation emitters 30 of the sensing unit, and infrared-sensitive phototransistors are preferred as detectors 36. These devices are inexpensive, readily available, and have long operating lives. By way of example, suitable diodes and phototransistors for the sensing unit are available from Motorola, Inc., as part numbers MLED930 and MRD300, respectively. Other types of radiation-transmitting pickups may, however, be employed in the invention; for example, magnetic pickups can be utilized.

A suitable spacing for the line of emitters 30 (and the opposed line of detectors 36) is at one inch centers, and the emitters and detectors may be mounted in a channel or box (see member 92 in FIG. 3) providing a gap of about seven-eighths inch between the opposed emitters and detectors. The elements 44 of a station code plate 20 in such an arrangement have a width of about one inch in the direction of movement of the sensing unit 85 so that the end elements 44a and 44h extend about half an inch beyond their corresponding emitters (30a, 30h) and detectors (36a, 36h) when the hoist (and sensing unit) are "on-station".

For certain applications requiring greater hoist-positioning accuracy than is assured by the above-described sensing unit with one inch plate elements 44, a second sensing unit may be provided having closely-spaced radiation emitters and an opposed similar group of detectors. This second sensing unit, termed a "station centering unit" is preferably used in conjunction with the earlier-described sensing unit (termed a "station identification unit") and provides fine position readings for accurately centering a hoist at a station.

Figure 2:
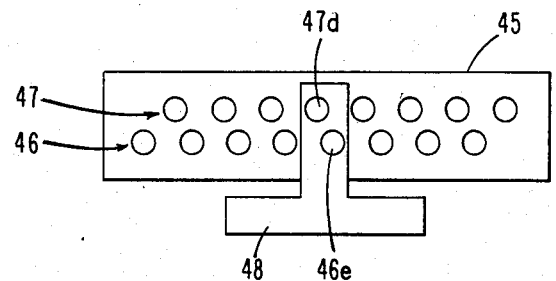
FIG. 2 is a front view of an array of closely-spaced emitters and a centering plate useful in accurately centering a hoist at a work station.

One suitable emitter array 45 for a station centering unit (FIG. 2) has two rows 46 and 47 of eight emitters staggered to provide an effective spacing of one quarter inch between emitters along their direction of movement. A centering plate such as the plate 48 is mounted at each work station and indicates centering of the emitter array 45 (and thus of the hoist to which it it is attached) to an accuracy of one quarter inch or better when the plate 48 blocks radiation from the emitters 46e and 47d as shown in FIG. 2. Such accuracy helps assure proper positioning of articles when they are lowered into tanks for treatment and may help reduce space required for the electroplating line.

Figure 3:
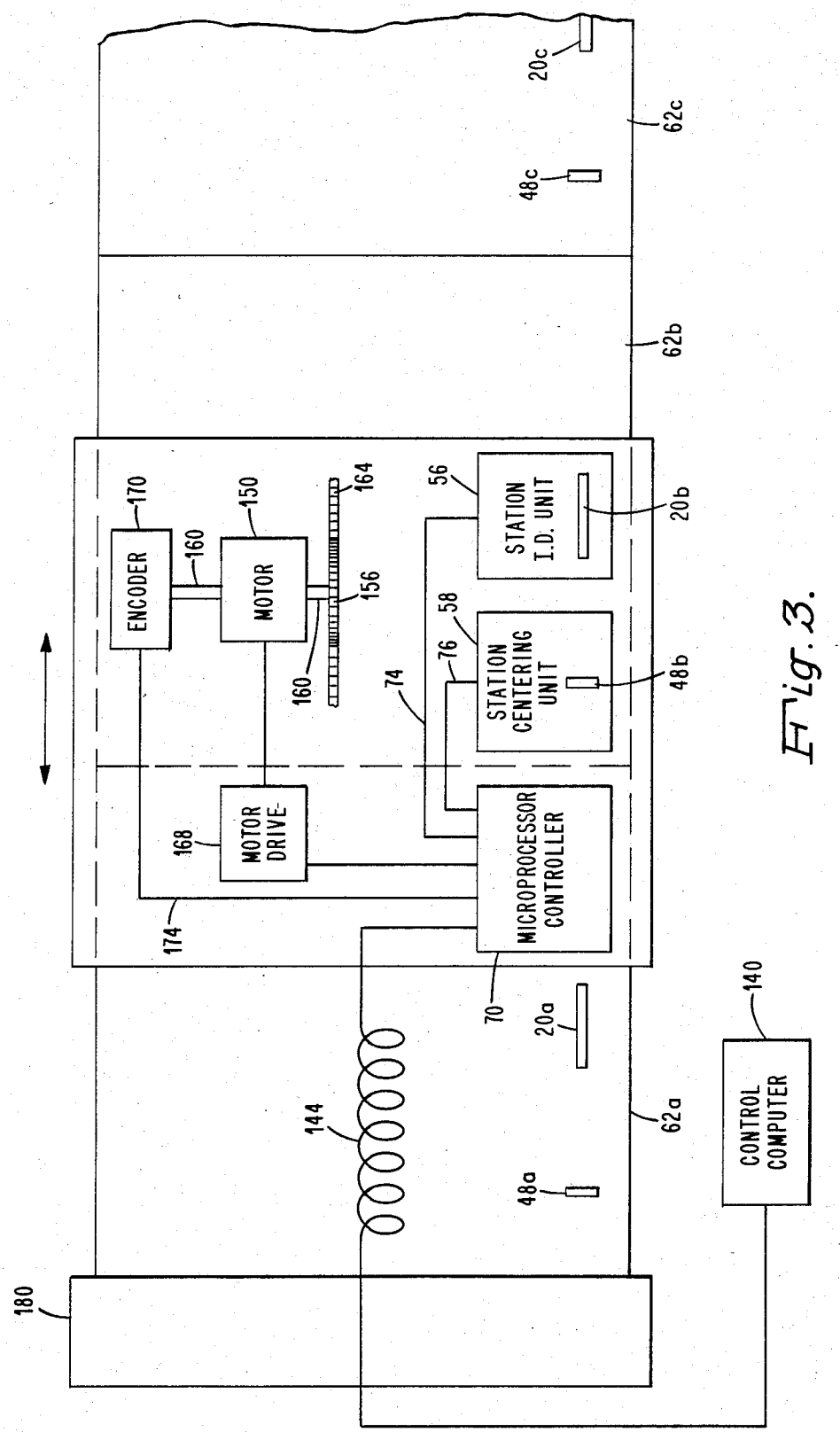
FIG. 3 is a combined block diagram and simplified plan view illustrating part of a line of electroplating tanks on an overhead hoist carrying various subsystems of the invention.

As is indicated in the modified block diagram of FIG. 3, a sensing unit such as the station identification unit 56 and, if needed, a station centering unit 58, are carried by a conveyor or hoist such as the overhead hoist 60. The hoist 60 is mounted over and is movable along a line of several treatment tanks, three of which are shown at 62a, 62b, and 62c. According to conventional practice the hoist 60 also is operable, by conventional mechanisms such as a motor and chain drive not illustrated herein, to lower articles into a bath or chemical solution carried by each tank 62 so that specific treatments such as stripping, cleaning, activating, plating, and rinsing may be performed in a prescribed sequence. Also shown in FIG. 3 are fixed station code plates 20a, 20b, 20c and station centering plates 48a, 48b, 48c and a microprocessor/controller 70 which receives signals from the units 56 and 58 along electrical lines 74, 76, respectively. (Other components illustated in FIG. 3 and their operating relationship with the microprocessor/controller 70 are described hereinafter in the discussion on hoist control.)

Figure 4:
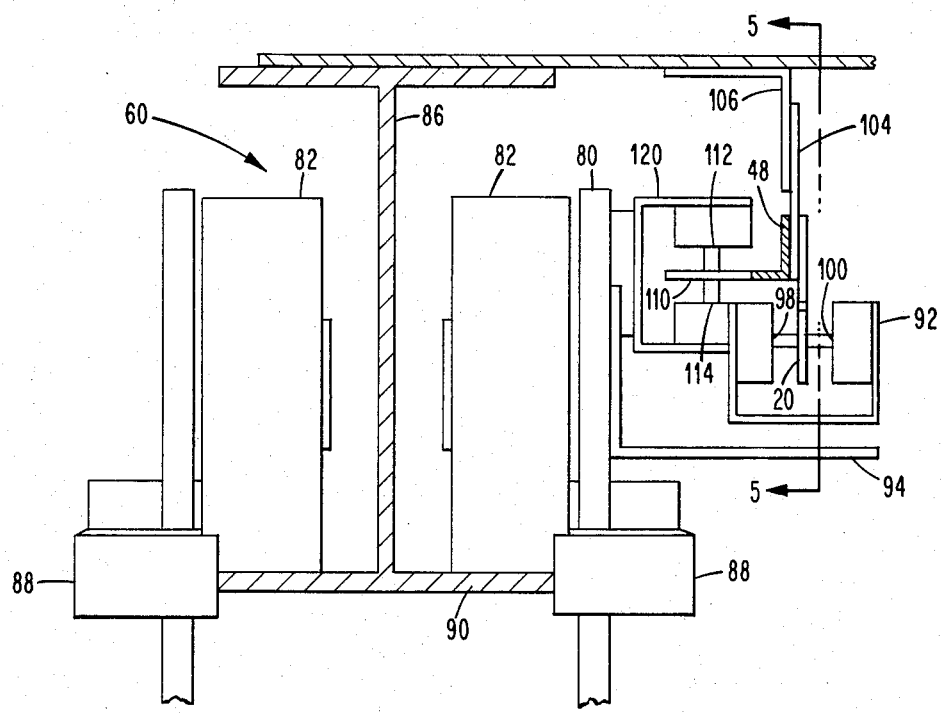
FIG. 4 is a partial sectional view of a movable overhead hoist illustrating a preferred mounting arrangement of two sensing units of the invention.
Figure 4:
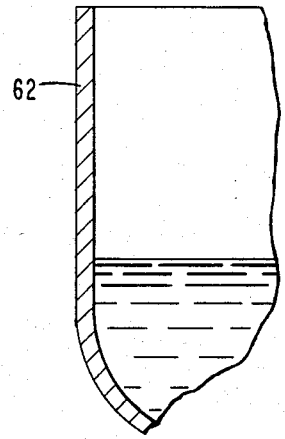
Figure 5:
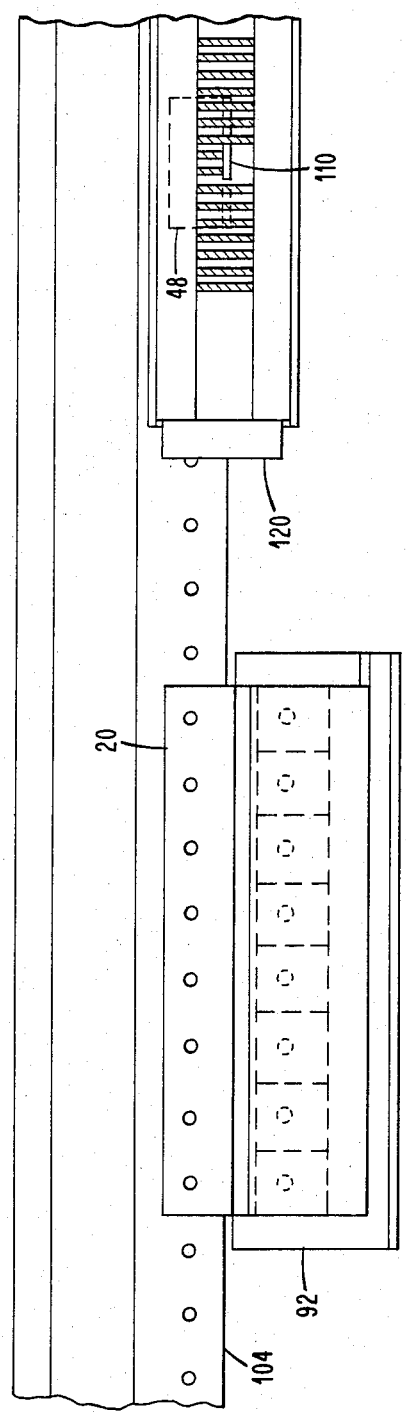
FIG. 5 is a view taken along the line 5—5 of FIG. 4.
Figure 7:
FIG. 7 is a view taken along the line 7—7 of FIG. 6.
Figure 6:
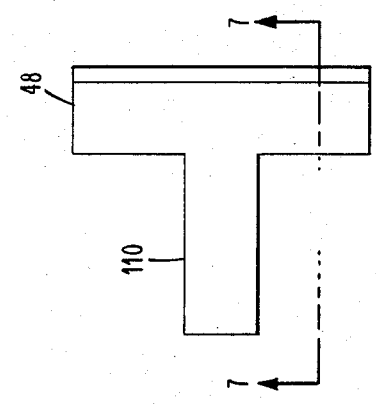
FIG. 6 is a view of a centering plate.
Figure 8:
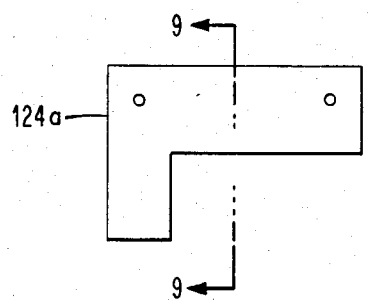
FIGS. 8-15 are views of half plates from which station code plates of various configurations may be constructed.
Figure 9:
Figure 10:
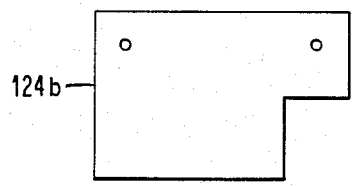
Figure 11:
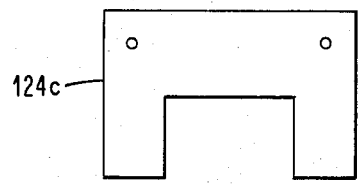
Figure 12:
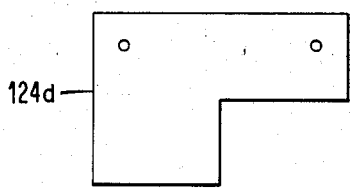
Figure 13:
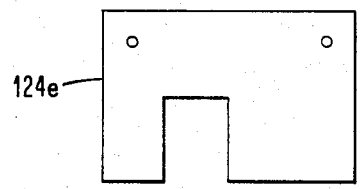
Figure 14:
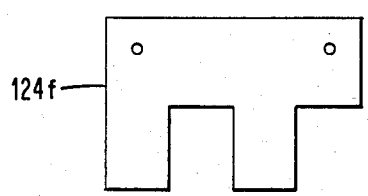
Figure 15:
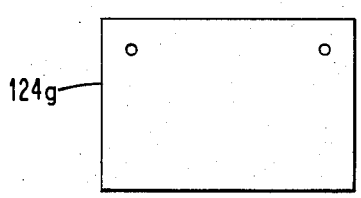

A preferred mounting arrangement of two sensing units on a movable overhead hoist 60 is illustrated in FIG. 4, and FIG. 5 shows the alignment of the elements of two station plates with these sensing units. As indicated in FIG. 4, a partial sectional view along a line of tanks such as the tank 62 (lower right), the overhead hoist 60 includes a frame 80, a pair of wheels 82 which ride generally horizontally along a fixed I-beam 86 of the superstructure of the plating line, and a set of guide wheels 88 which ride along the lower member 90 of the I-beam 86. The eight pickup sensing unit 56 for station is mounted in a box or channel member 92 which is attached to the hoist frame 80 by a bracket 94. Its infrared diodes 98 emit radiation in a generally horizontal direction for interaction with the vertically-oriented station code plates such as the plate 20 and detection by the opposed phototransistors 100. The stationary code plate 20 is secured to a perforated mounting strip 104 extending along the plating line and which in turn is attached to a bracket 106 secured to fixed superstructure 108 of the plating line. Also attached to the mounting strip 104 are station centering plates such as the plate 48 having an L-shaped cross section (For other views of the centering plate 48 see FIGS. 6 and 7). As shown in FIGS. 4 and 5, the plate 48 has an element 110 oriented horizontally to intercept radiation directed vertically by the infrared emitting diodes 112 of the sixteen-pickup station centering unit 58. These diodes 112 and an opposed array of phototransistors 114 are mounted in a channel member 120 orthogonal to the member 92 and attached to the hoist frame 80 at a position (FIG. 5) displaced from the member 92 a distance along the direction of movement of the hoist 60.

As disclosed earlier, the station code plates serve two functions as they move with the hoist along a line of work stations. First, their end elements, upon blocking radiation from corresponding end emitters of a sensing unit, indicate that the sensing unit and the hoist to which it is attached have arrived at a work station. Second, the station code plates, by the pattern of emissions blocked by their inner six elements, provide positive identification of the particular station at which the hoist is positioned.

A preferred technique for forming station code plates such as that illustrated in FIG. 1 is to provide a set of half plates 124 with each half plate having one to four elements as shown in FIGS. 8-15 and to mount two half plates 124 in a side-by-side arrangement. An advantage of using the half plates 124 of FIGS. 8-15 is that just seven different half plate configurations are required to form up to sixty-four separate plate patterns (and thus to identify sixty-four different stations).

Figure 16:
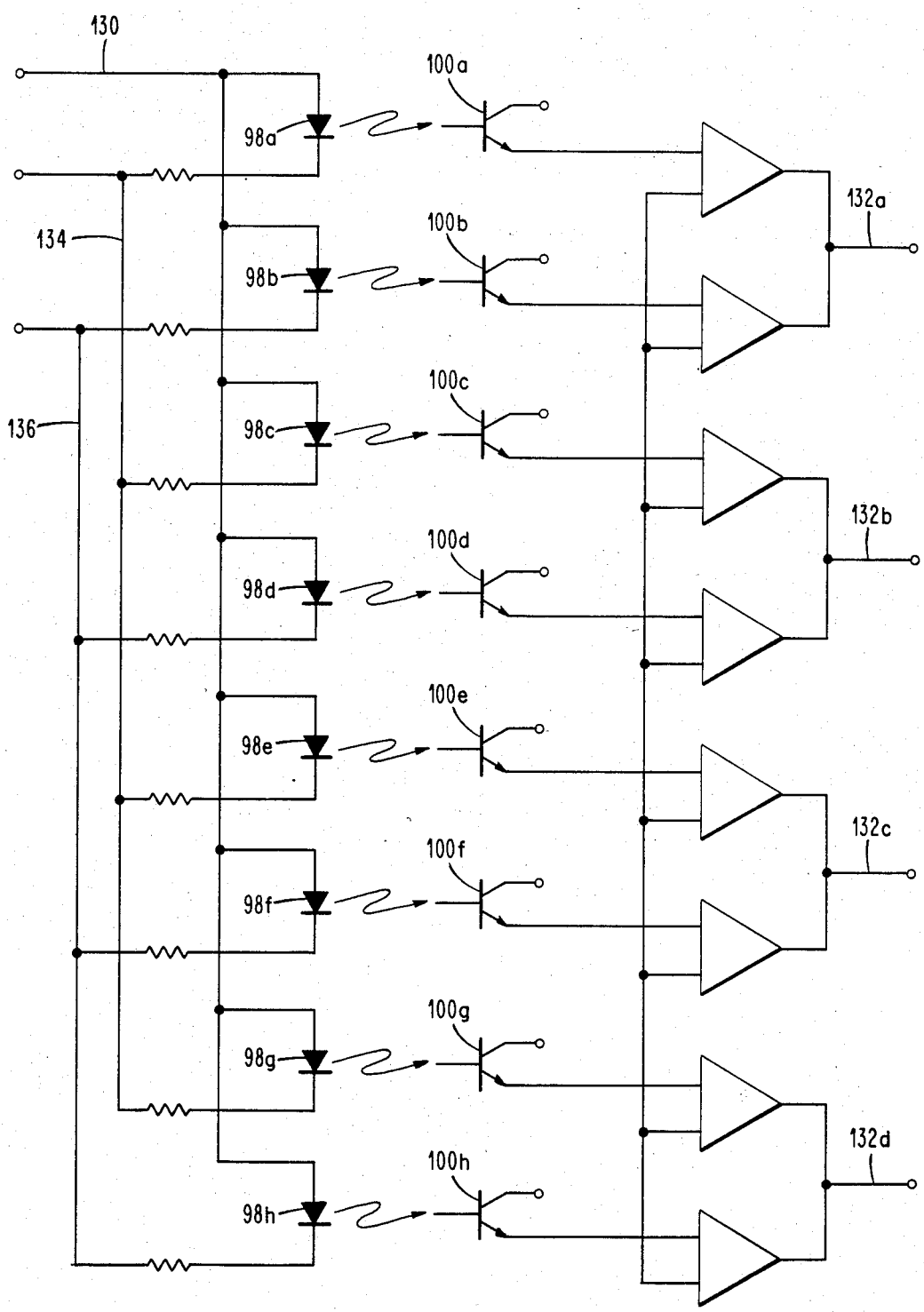
FIG. 16 is an electrical schematic of an eight-pickup station identification sensing unit according to the invention.

An electrical schematic of the eight-pickup station identification sensing unit 56 (FIG. 16) shows eight infrared emitting diodes 98 connected to receive electrical power from an input line 130 and eight opposed phototransistors 100 operable to sense radiation emitted by the diodes 98. In the arrangement shown, the phototransistors 100 of the sensing unit 56 are connected in pairs so that just four output lines 132a, 132b, 132c, and 132d directed to the microprocessor 70 (FIG. 3) are required rather than eight. Each alternative infrared emitting diode is in turn connected to either of two return lines 134 and 136 so that, under control of electronic switches in the power source (not shown) for the diodes, electrical power may be switched at high speed to alternate between the diodes 98a, 98c, 98e, 98g and diodes 98b, 98d, 98f, 98h. This arrangement, in addition to reducing the number of lines required to the microprocessor/controller 70, increases the operational life of the infrared emitting diodes 98.

Figure 17:
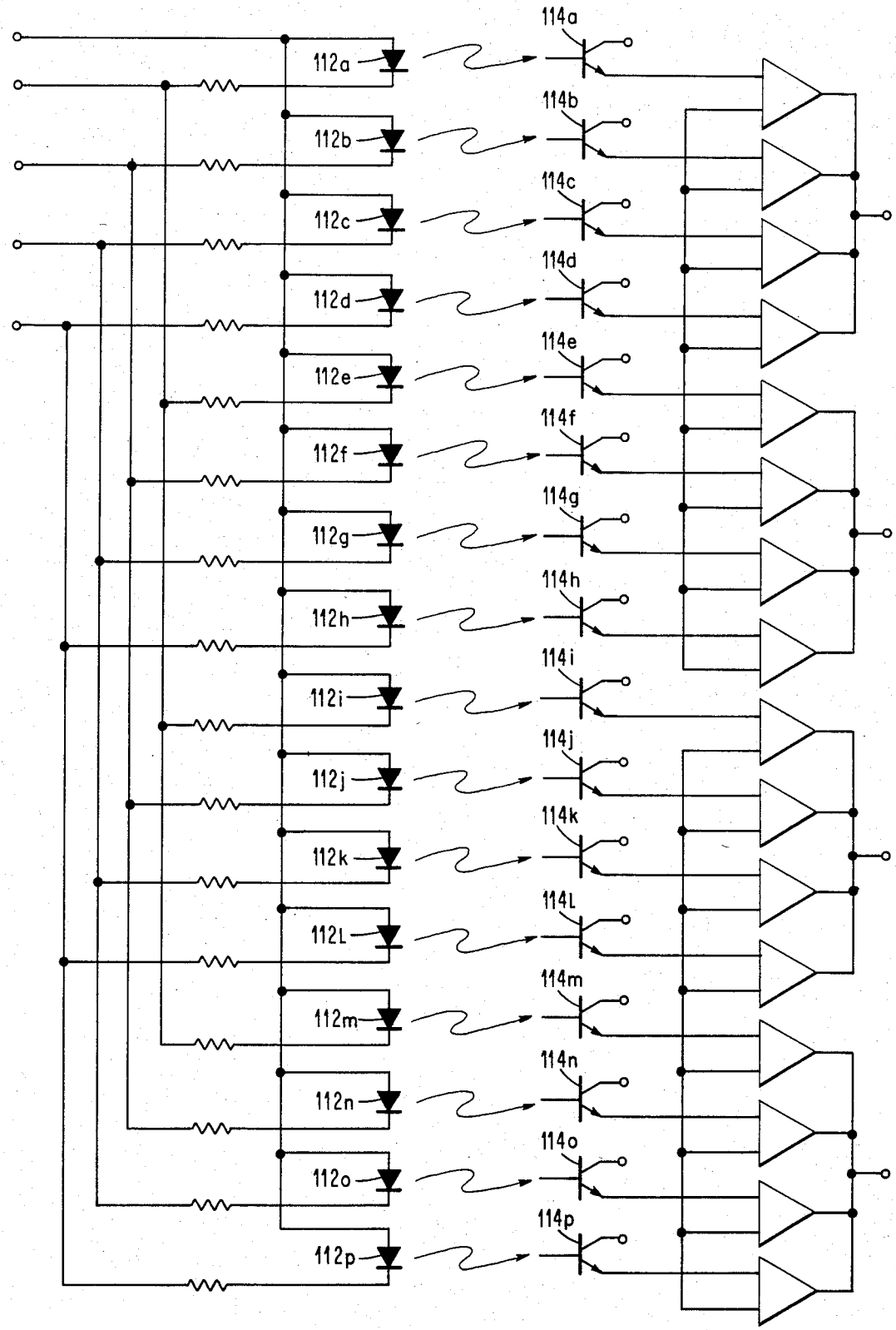
FIG. 17 is an electrical schematic of a sixteen-pickup station centering sensing unit according to the invention.

FIG. 17 shows a similar arrangement for the sixteen-pickup station centering sensing unit 58, with the phototransistors 114 connected in groups of four and the infrared emitting diodes 112 wired such that power is alternately supplied to every fourth diode in the array. Thus at any time during operation of the station centering unit 58, just one phototransistor in each group may receive radiation from its corresponding infrared emitting diode. However, since power-switching among the diodes occurs at a substantially greater speed than that at which the hoist 60 moves, it appears to the hoist as if radiation is emitted continuously by each diode.

FIG. 3 illustrates a preferred system for controlling the position of a hoist along a line of tanks and which incorporates the position identification and centering subsystems described to this point. The position control system includes a control computer 140 which is preferably positioned at a convenient off-hoist location and is connected to the hoist-mounted microprocessor/controller 70 by a ribbon cable 144. Major functions of the control computer 140 include processing and storing information received from the microprocessor/controller 70 and generating and relaying hoist positioning instructions to the microprocessor/controller 70. A suitable computer 140 for an electroplating line is a PM550 programmable controller available from Texas Instruments Inc., and the microprocessor/controller 70 may be a Motorola model 6805.

To drive the hoist 60 horizontally to a desired work station along the line of tanks, a motor 150 is mounted on the electroplating hoist 60, and a gear 156 attached to the motor shaft 160 engages a fixed drive chain 164 extending along the line of tanks. Also connected to the hoist motor 150 is a variable frequency motor drive 168 under control of the microprocessor/controller 70.

Sensing unit 56, through its interaction with station coding plates, provides signals to the microprocessor/controller 70 which indicate on-station positioning of the hoist 60. However, in order to move the hoist 60 to, and stop it at, a desired work station, information is required on hoist position between stations—so that, for example, instructions may be relayed from the microprocessor/controller 70 to the motor drive 168 and applicable brake mechanisms to reduce the speed of the motor 150 in advance of arrival of the hoist 60 at the selected station. To provide accurate data on position of the hoist 60 between stations and also to verify on-station positioning, the hoist control system of the invention includes an encoder 170 such as an optical rotary encoder mounted on the shaft 160 of the motor 150 and electrically connected to the microprocessor/controller 70 along a line 174. A suitable encoder 170 is a two-light system rotary encoder, Disc Instruments No. EC82-1024-5, available from Honeywell Inc. This rotary encoder produces 1000 pulses per rotation of the motor shaft 160 and is directional—i.e., its output indicates shaft direction as well as revolutions. Since the relationship is known between shaft revolutions and the distance the hoist is moved along the drive chain 164 by the shaft-mounted gear 156, the position of the hoist along the line of tanks can readily by determined from output of the encoder 170. In particular, signals from the encoder 170 and from the station identification sensing unit 56 (and, if desired, from a station centering sensing unit such as the unit 58) provide independent information regarding "on-station" positioning of the hoist 60. Agreement (to within specified tolerances) between these independent sources at various work stations confirms accuracy of the rotary encoder data, giving added confidence in its use to indicate hoist position between stations.

During operation, the hoist 60 may be initially positioned at a load/unload station 180 where it picks up parts—e.g., a barrel loaded with metal articles to be plated. The control computer 140 is programmed to furnish signals to the microprocessor/controller 70 to instruct the hoist 60 to move to selected stations along the line of tanks according to a prescribed sequence. The microprocessor/controller 70, based on the next work station position desired and on information on current position received from sensing units 56 and 58 and the encoder 170, directs the motor drive 168 and in turn the motor 150 to rapidly move the hoist 60 to the desired new position. Since the sensing units 56 and 58 and the encoder 170 continue to provide updated position data as they move with the hoist 60 to the selected work station, the microprocessor/controller 70 is readily able to slow the speed of the hoist 60 through control of the motor drive 168 and to accurately center the hoist at the desired position for processing of the parts it carries.

Figure 18:
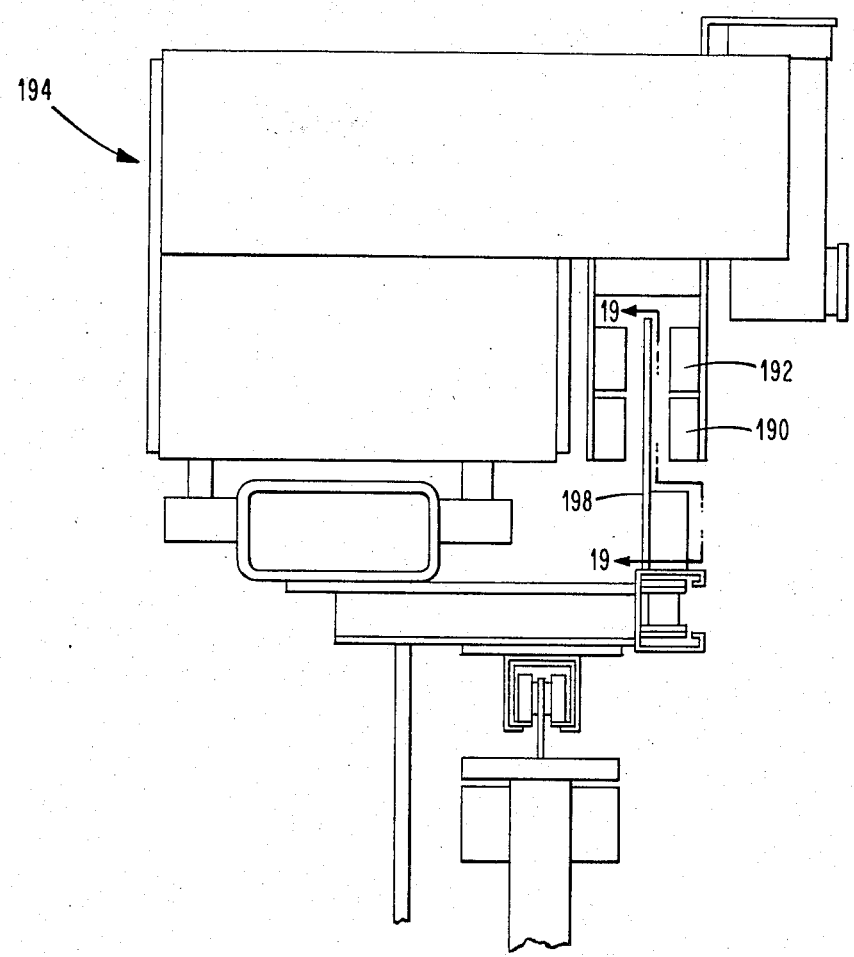
FIG. 18 is a fragmentary sectional view of a movable side arm hoist showing an alternate arrangement of two sensing units and station plates.
Figure 19:
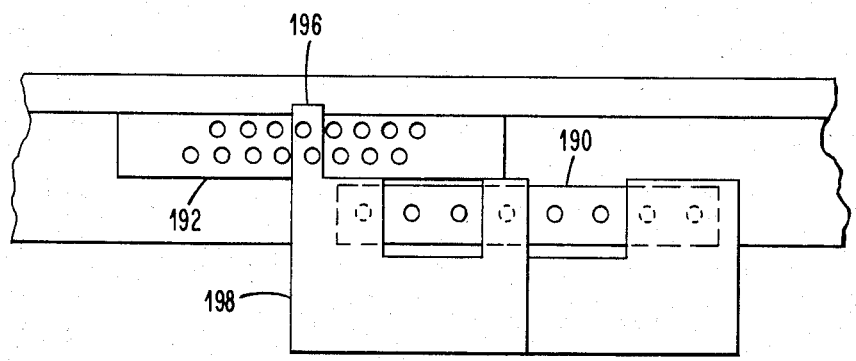
FIG. 19 is a view taken along the line 19—19 of FIG. 18.

FIGS. 18 and 19 illustrate two sensing units 190 and 192 similar to those described with reference to FIGS. 4 and 5 but mounted in a vertically stacked arrangement on a side-mounted or sidearm hoist 194. As indicated in FIG. 19 the station identification sensing unit 190 is offset along the direction of movement of the hoist 194 from the station centering sensing unit 192. Also, the end element 196 of a station code plate such as the plate 198 is elongated so as to serve as a centering element to block radiation from emitters of the sensing unit 192 as well as an "on-station" indicator.

Thus there has been shown and described an improved system for monitoring and controlling the position of a conveyor such as a movable hoist of an electroplating line. The system utilizes low cost, reliable optical sensing units mounted on the hoist and having transmissive pickups which are compact and easy to install and test. The sensing units interact with fixed station plates and a hoist-mounted microprocessor/controller to provide both station identifications and centering information for control of hoist position. These subsystems, in combination with a rotary encoder and motor drive linked to a hoist motor and to the microprocessor controller, and under the direction of a supervisory off-hoist computer, permit fast, accurate positioning of the hoist at various stations along a line of tanks.

What is claimed is:

1. Apparatus for monitoring and controlling the position of a hoist operable to move articles to and from selected work stations located along a line of tanks comprising:

a frame for supporting the hoist above said tanks;

a sensing unit mounted on the hoist, said sensing unit including an array of radiation emitters spaced along the direction of movement of said hoist and an array of radiation detectors facing said radiation emitters and defining an elongated gap therebetween;

a mounting strip attached to said frame and extending along said line of tanks;

a stationary plate attached to said mounting strip at each of said work stations, each of said places having elements for blocking radiation from selected emitters of said sensing unit when said hoist is moved to, or positoned at, a work station, to indicate that the hoist is positioned at a work station and to indicate the identify of said station;

said mounting strip having regularly spaced perforations for facilitating relocation of one or more of said stationary plates;

drive means for moving said hoist among, and stopping said hoist at, said work stations without physically contacting any of said plates;

an encoder attached to said drive means, said encoder operable to provide signals indicating the distance and direction of movement of said hoist from a reference point; and a computer connected to said sensing unit, to said drive means, and to said encoder, said computer operable: (a) from signals produced by said sensing unit, to determine the position of the hoist at a work station and the identity of said station, (b) from signals from said encoder, to determine the position of the hoist between work stations and to verify on-station positioning of said hoist, and (c) by use of the position information of (a) and (b) above, to direct said drive means to rapidly move the hoist to, and stop the hoist at, a selected work station.

2. Apparatus as in claim 1 including a centering unit mounted on said hoist, said centering unit including an array of radiation emitters closely spaced along the direction of movement of said hoist and a matching array of radiation detectors facing the emitters of said centering unit and defining an elongated centering gap therebetween; and a stationary centering plate at each of said work stations for entering said centering gap and blocking the radiation generated by one or more selected emitters of said centering unit when said hoist is moved to another station;

said computer electrically connected to said centering unit and operable to determine, from the radiation sensed by the detectors of said centering unit, when said hoist is centered at a work station.

3. Apparatus as in claim 2 wherein the arrays of radiation emitters and radiation detectors of said centering unit each comprise two rows of emitters and two rows of detectors, respectively, staggered along the direction of movement of said hoist, said staggered rows enhancing the accuracy of positioning of said hoist.

4. Apparatus as in claim 1 wherein each said plate includes a pair of end elements for blocking radiation from the pair of emitters at opposite ends of said array to indicate that the hoist is positioned at a work station, and a set of elements between said pair of end elements to indicate the identify of the work station at which said plate is located.

5. Apparatus as in claim 4 wherein each plate is formed of two separate half plates, each said half plate having from one to four elements and being mounted in side-by-side arrangement with a second half plate, whereby many different work stations may be identified using combinations of a minimum number of different half plates.

6. Apparatus as in claim 4 wherein said centering plate comprises an elongated portion of one of said end elements.

* * * * *